United States Patent Office 2,908,553
Patented Oct. 13, 1959

2,908,553

PROCESS FOR THE PRODUCTION OF SILICON CARBIDE

Hubert Frank, Dusseldorf-Heerdt, and Ehrhardt Wilkendorf, Koln, Germany

No Drawing. Application January 10, 1956
Serial No. 558,190

Claims priority, application Germany January 14, 1955

3 Claims. (Cl. 23—208)

The present invention relates to a process for the production of silicon carbide from sand and carbon (petroleum coke) by electric resistance heating.

The silicon carbide produced from sand and, for example, petroleum coke in electric resistance furnaces at a temperature of approximately 2,000° is normally, in the solid phase, in the form of hexagonal crystals, but it should be noted that there are a large number of modifications of this hexagonal crystalline form of silicon carbide. When silicon carbide produced in this way is treated so as to obtain refractory masses, for example refractory shaped elements, a certain instability can be observed in the silicon carbide, this instability making itself felt most unpleasantly in the temperature range between 900 and 1100°. The reasons for the instability which has been observed have not yet been explained in detail. However, the applicants incline to the following explanation:

In the temperature range between 900 and 1100° at least a proportion of the hexagonal silicon carbide crystals are transformed into cubic crystals. During this transformation the crystal lattice of the silicon carbide is evidently particularly sensitive or receptive to foreign atoms, for example oxygen, so that in this temperature range it is possible for a sudden oxidation to take place, which in some cases can considerably exceed the normal limits.

It has now been found that the silicon carbide lattice can be rendered very much less sensitive to the influence of foreign atoms in the temperature range between 900 and 1100° by adding to the starting mixture of sand and carbon certain metallic compounds in comparatively small quantities, more particularly metallic oxides which at the appropriate reaction tempearture form corresponding metallic carbides with a relatively high evaporation point.

An addition of oxides of boron, titanium or zirconium or of a mixture of two or more such oxides has been found particularly suitable for this purpose. The stabilisation of the silicon carbide by the addition according to the invention is probably effected in that the carbides which develop from the added compounds are at least partly built into the lattice of the silicon carbide which is produced, so that the said lattice is less sensitive to foreign atoms, more particularly oxygen.

The addition of oxides of boron, titanium or zirconium may vary within comparatively wide limits, according to the requirements expected of the silicon carbide subsequently. An addition of 0.1–5%, preferably of 0.3–2%, calculated on the total mass, has been found to be particularly advantageous in most cases.

We claim:

1. In a process for the manufacture of a product consisting essentially of stabilized silicon carbide which comprises the electric resistance heating of a mixture consisting essentially of silica and carbon, at a temperature of at least 2000° C., the improvement which comprises forming a reaction mixture consisting essentially of silica and carbon and admixing with said mixture prior to heating, in an amount from 0.1% to 5% by weight of said mixture, a metal compound selected from the group consisting of boron oxide, titanium oxide, and zirconium oxide, which forms, at the temperature to which said mixture is heated, a metal carbide having a vaporization point above that of said resulting silicon carbide and subjecting the admixed reaction mixture to said temperature to form silicon carbide having the minor amount of the carbide formed from said metal compound in the lattice of said silicon carbide.

2. A process according to claim 1 wherein the amount of metal compound included in said mixture is not less than 0.3% and not more than 2% by weight of said mixture.

3. A process according to claim 1 wherein said carbon is in the form of petroleum coke.

References Cited in the file of this patent

UNITED STATES PATENTS

| | | |
|---|---|---|
| 589,415 | De Chalmot | Sept. 7, 1897 |
| 1,343,976 | Liebman et al. | June 22, 1920 |
| 2,109,246 | Boyer et al. | Feb. 22, 1938 |
| 2,110,733 | Kinzie et al. | Mar. 8, 1938 |